July 4, 1933.  A. F. WILLS ET AL  1,917,175
METAL JOINT WASHER OR GASKET
Filed May 14, 1932
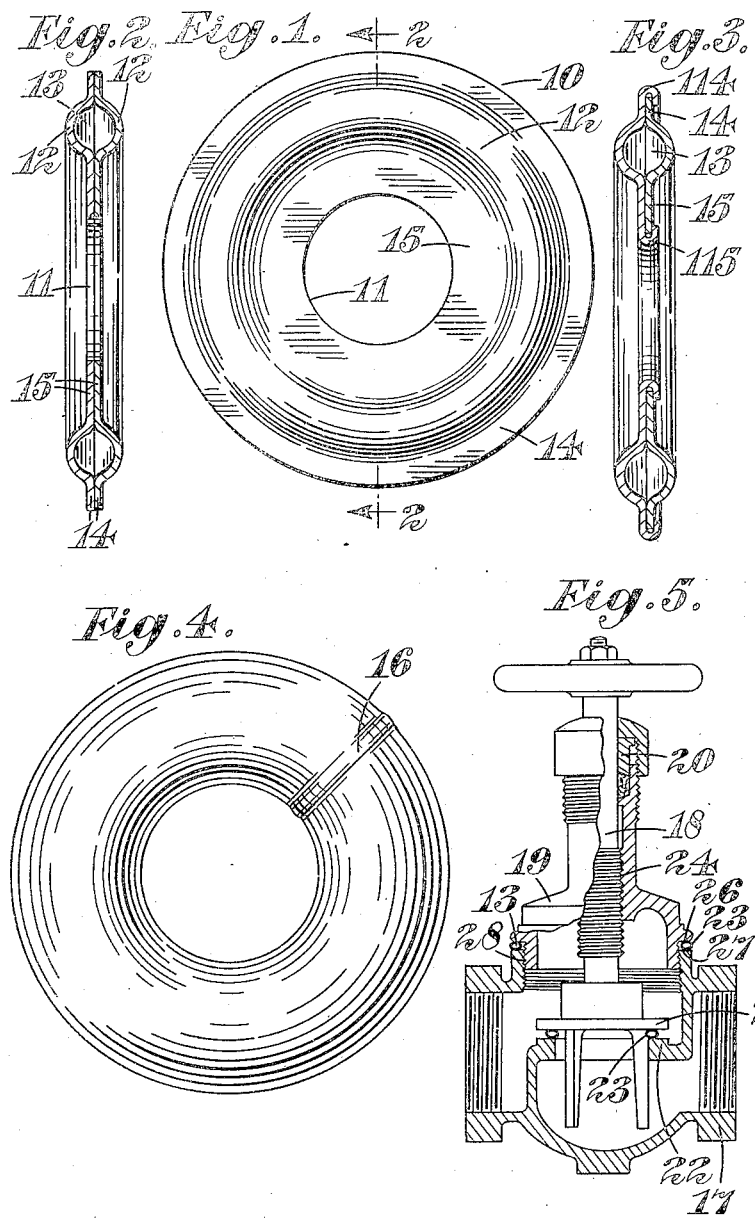
INVENTORS
Arnold Frank Wills
Percy Wills
By Byrne Stebbins
Parmelee & Blenko
Attorneys Patented July 4, 1933

1,917,175

UNITED STATES PATENT OFFICE

ARNOLD FRANK WILLS, OF BURNHAM-ON-SEA, AND PERCY WILLS, OF BRIDGWATER, ENGLAND

METAL JOINT WASHER OR GASKET

Application filed May 14, 1932, Serial No. 611,270, and in Great Britain June 29, 1931.

This invention relates to joint-washers or gaskets for sealing joints for example in pipe conduits (or for use between a valve member and its seat) particularly for steam, air, liquid or other fluid medium at high pressure, or vacuum. The invention is concerned with a joint-washer of the type comprising a sealed hollow metal chamber of annular form which is filled with fluid (e. g. air) and whereof the walls are capable of yielding upon the application of the clamping pressure applied in the making of the joint.

The present invention comprises a joint-washer of the type described above which is loaded initially (i. e. before any clamping pressure is exerted and while the bore still conforms to its original cross-section) with a gas under super-atmospheric pressure. Preferably the original cross-section of the bore of the hollow chamber is circular.

According to a further feature of the invention the joint-washer or gasket may comprise two superimposed annular metal plates which are sealed together at their inner and outer peripheral edges and one or each of which is approximately embossed to form the hollow chamber aforesaid.

The invention also includes in a joint, for example, in a pipe conduit, the combination with two opposed clamping faces means for drawing them together of a joint-washer or gasket and formed as hereinbefore described and so located with respect to these faces that the clamping pressure is exerted across the bore of the washer and the initial gaseous pressure therein affords a resilient resistance upon the slight application of clamping pressure.

The invention also includes a joint-washer or gasket in which the original gaseous loading of the hollow chamber is effected by carrying out the sealing of the hollow chamber in an ambient atmosphere itself under pressure or by sealing within the hollow chamber chemicals which are of such a nature as to generate a gas upon reaction.

The invention resides in appreciating that if the hollow chamber of a washer or gasket for use in a joint is filled initially (i. e. prior to use between opposed clamping faces) with a gas under super-atmospheric pressure an appreciable resilience can be given to the walls of the hollow chamber to impart high efficiency to the valve or an effective sealing to the pipe joint whether the washer or gasket is used at low or high temperatures or pressures.

Various constructions of washers or gaskets according to the present invention will now be described in detail with reference to Figures 1 to 4 of the drawing.

Of these figures:

Figure 1 is a plan of a washer or gasket,

Figure 2 is a section on the line 2—2 in Figure 1,

Figure 3 is a section through an alternative construction, while

Figure 4 is a plan view of a still further alternative construction,

Figure 5 is a sectional elevation view of a screw-down stopper-valve incorporating a washer and a gasket in accordance with the invention.

Throughout this description like reference numerals indicate like parts.

The washer 10 shown in Figure 1 is circular in plan and is formed with a central aperture 11. It consists of two superimposed metal plates each pressed with an upstanding ring 12 so shaped that when the plates are placed one upon the other a chamber 13 of approximately circular cross section is formed surrounding the central aperture 11. Each plate is formed with a projecting flat flange 14 outside the chamber and a further flange 15 inside the chamber and the flanges 14, 14 and 15, 15 are sealed together at their edges by brazing, soldering or welding or by riveting. The operation of sealing the flanges together may be performed in a chamber containing air or other gas under pressure or alternatively chemicals may be sealed into the hollow chamber 13 of such a nature as to generate a gas upon reaction. The various chemicals may be maintained out of contact with one another during the sealing operation by encasing them in wax or other suitable medium.

In the example shown in Figure 3 the seal for the hollow chamber 13 is made by spinning the edges of the flanges 114 and 115 of one plate over the corresponding edges of the flanges 14 and 15 on the other plate.

In the example shown in Figure 4, a washer according to this invention is made by bending a piece of tubular material around into annular form and joining the ends by welding or the like as at 16.

In Figure 5 the screw-down stopper-valve comprises the normal valve body 17, spindle 18, threaded at 24 to operate the valve 21, cover plate 19, and stuffing box arrangement 20.

Between the cover plate 19 and the valve body 17 is located a washer 23 in accordance with the construction shown in Figure 4. In utilizing this washer the weld at 16 is of course smoothed off flush. The opposed clamping faces 26 and 27 on 19 and 17 deform the washer 23 which contains gas under super-atmospheric pressure and which then accommodates itself to any unevennesses on the opposed faces. This takes place as the cover plate 19 is screwed into the valve body 17 by means of the threads 28.

Between the valve 21 and its seat 22 formed in the valve body 17 is located a washer 23 similar in construction to the form illustrated in Figure 4. In conjunction with the valve 21 the washer 23 forms an effective seal when the valve is forced on to its seat. Owing to the high pressure in the interior of the washer (the internal pressure in this example is 300 lbs. per sq. inch for a ring formed from a copper pipe of $\frac{3}{16}$ inch outside diameter, 21 gauge pipe) a degree of resilience is given to the walls of the ring and the internal pressure with the above figures gives a recovery of approximately 0.010 inch after the washer has been reduced to half its original outside diameter by clamping between the valve 21 and its seat 22.

In making the washer any metal which is sufficiently resilient to provide a resilient resistance in the wall of the hollow chamber of the washer when the hollow chamber is pressure filled may be used. We have used solid drawn copper with a bore of circular cross section of a gauge depending on the particular job for which the valve is designed.

For large pipe joints we utilized ¼ inch to $\frac{5}{16}$ inch outside diameter copper tubes having 18 gauge. These particular sizes are merely given by way of example since the internal pressure need only be high enough to give a degree of resiliency with any given gauge of copper. Much thinner tubing than that specified herein can be used with a corresponding decrease of internal pressure and the same results so far as resilience is concerned can be obtained in practice. The wall of the hollow chamber, however, must have, particularly when the washer is used in connection with a valve, a certain amount of substance to enable it to resist the ordinary wear and tear caused by moving the valve member on to its seat during the operation of the valve or in making and breaking a pipe joint. For all ordinary practical purposes a pressure of 20 lbs. per sq. inch inside the hollow chamber is inadequate except where material of the washer is very thin and it is only possible to make the material thin where the pipe line in connection with which the washer is used is carrying very small pressure and is subjected to very little wear and tear.

Nickel tubing and tubing of "Monel" metal have been used but higher internal pressures than 300 lbs. per sq. inch are required to give the walls of such washers the desired resiliency of 0.010 inch. The cross-section of the hollow chamber is preferably circular but in some cases a diamond or elliptical cross-section would yield satisfactory results.

Instead of completely filling the sealed chamber with a gas it may contain a "filling" material such as rubber in addition to the gas.

The metal portions of the washers may be formed to shape in any suitable manner, such as pressing, spinning, or turning, and the seal may also be made in any suitable manner such as welding, sweating or soldering, brazing, spinning over or riveting.

It has been found that a washer or gasket as provided by the present invention is exceedingly efficacious, as the walls of the enclosed chamber yield readily to uneven surfaces, while at the same time they mould themselves by reason of the internal pressure until they conform with the surfaces with which they are in contact, and therefore high clamping pressures are unnecessary.

A reinforcing ring may be inserted in the chamber, to limit the permissible compression of the washer or gasket.

We claim:—

1. As a new article of manufacture a hermetically sealed hollow metal sealing ring having a chamber of substantially annular form filled with a gas under a pressure of the order of three hundred pounds per square inch while the bore of the chamber still conforms to its original cross section.

2. As a new article of manufacture, a substantially annular hermetically sealed chamber constituted by a metal tube of substantially circular cross-section filled with a gas under a pressure of the order of three hundred pounds per square inch and adapted to be interposed in sealing relation between opposed surfaces, and to be returned to its original shape by the pressure of the contained gas when the sealing pressure is relieved.

In testimony whereof we have signed our names to this specification.

ARNOLD FRANK WILLS.
PERCY WILLS.